United States Patent
Myszne

(10) Patent No.: US 7,106,859 B2
(45) Date of Patent: Sep. 12, 2006

(54) PARALLEL DATA SCRAMBLER

(75) Inventor: Jorge Myszne, Zikron Ya'akov (IL)

(73) Assignee: Intel Corporation, Santa Clara, CA (US)

( * ) Notice: Subject to any disclaimer, the term of this patent is extended or adjusted under 35 U.S.C. 154(b) by 1024 days.

(21) Appl. No.: 09/977,250

(22) Filed: Oct. 16, 2001

(65) Prior Publication Data

US 2003/0072449 A1   Apr. 17, 2003

(51) Int. Cl.
*G06F 17/00* (2006.01)

(52) U.S. Cl. .................. 380/30; 380/210; 380/255; 380/265; 380/259

(58) Field of Classification Search .............. 380/30, 380/210, 255, 268, 275, 265, 259
See application file for complete search history.

(56) References Cited

OTHER PUBLICATIONS

Applications of sequence space and SRG theories to distributed sample scrambling; Seok Chang Kim; Byeong Gi Lee; Communications, IEEE Transactions on vol. 45, Issue 9, Sep. 1997 pp. 1043-1052.*

Implementation of parallel DSS for cell-based ATM physical layer; Kim et al. ; SUPERCOMM/ICC '94, Serving Humanity Through Communications. IEEE International Conference on May 1-5, 1994 pp. 1359-1363 vol. 3.*

Integrated parallel scrambler design for high-speed transmission systems; Lee, S.H.; Lee, P.J.; Circuits and Systems, 1988., IEEE International Symposium on Jun. 7-9, 1988 pp. 361-364 vol. 1.*

Sang, H. Lee et al, "Integrated Parallel Scrambler Design For High-Speed Transmission Systems", *ISCAS 1988*, pp. 361-364.

* cited by examiner

*Primary Examiner*—David Jung
(74) *Attorney, Agent, or Firm*—Pearl Cohen Zedek Latze LLP

(57) ABSTRACT

A data scrambler is capable of scrambling N bits of data in parallel using a $2^B-1$ bit scrambling sequence. The scrambler may store scrambling values of an m-sequence in a table. The table may be formed into at least two overlapping swaths of N columns, wherein each swath may store the m-sequence and the m-sequence of one swath is shifted from the m-sequence of a second swath. The scrambler may read a current swath N bits at a time and then may scramble N bits of input data in parallel using the N bits of the swath. When the swath is finished, the scrambler may shift to another swath.

14 Claims, 5 Drawing Sheets

|     | 1   | 2   |     |     |     |     |     | 8   | 9   |     |     |     |     |     | 15  |
|-----|-----|-----|-----|-----|-----|-----|-----|-----|-----|-----|-----|-----|-----|-----|-----|
| 1   | 1   | 2   |     |     |     |     |     | 8   | 9   | 10  |     |     |     |     | 15  |
|     | 9   | 10  |     |     |     |     |     |     | 15  | 16  |     |     |     |     | 23  |
| R   | (R−1)N+1 | | | | | | | | | | | | | | (R+1)N−1 |
| 15  | 113 | 114 |     |     |     |     |     |     | 120 | 121 | 122 |     |     |     | 127 |
| 16  | 121 | 122 |     |     |     |     |     | 127 | 1   | 2   | 3   |     |     |     | 8   |

PARALLEL DATA SCRAMBLER

FIELD OF THE INVENTION

The present invention relates data scramblers generally.

BACKGROUND OF THE INVENTION

Data scramblers can be found in many communication systems and operate to scramble transmitted data. One type of scrambler is a feedback scrambler whose output is XORed with the data to be transmitted. The scrambler operates serially; as eat bit of the data is received, it is XORed wit the current value produced by the scrambler.

BRIEF DESCRIPTION OF THE DRAWINGS

The present invention will be understood and appreciated more fully from the following detailed description taken in conjunction with the appended drawings in which:

FIG. 3A is an illustration of a table useful in the scrambler of FIG. 2;

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Figure 1:
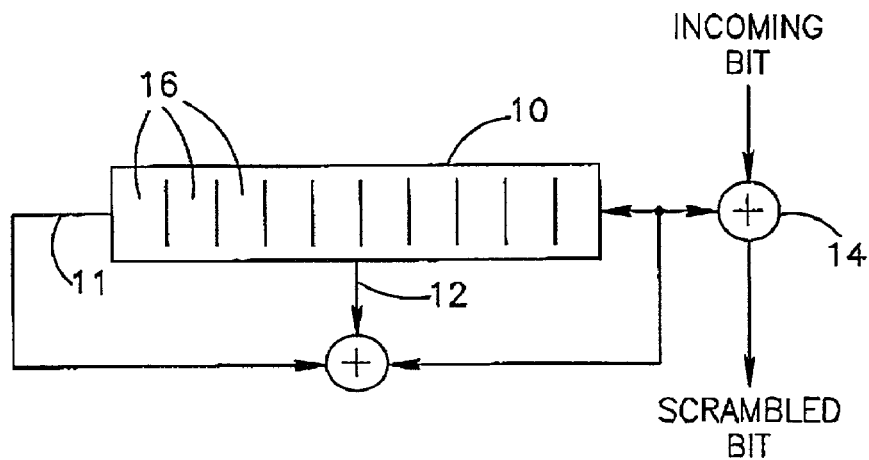
FIG. 1 is an illustration of a serial data scrambler.

Reference is now made to FIG. 1, which illustrates a serial scrambler. The scrambler may comprise a polynomial or "m-sequence" generator 10, one or more taps 12 and a XOR unit 14. Generator 10 may have a plurality of storage elements 16, each storing one element of the sequence. For example, the sequence might be the coefficients of an 7th order polynomial, such as $x^7+x^4+1$, where the coefficients can have the values 1 and 0 only. This sequence requires seven storage elements 16, with one tap from the seventh, fourth and first storage elements. Generator 10 is cyclic, using its output as the input to the first storage element, and has $2^7-1$ or 127 values. Any Bth order generator produces an m-sequence of $2^B-1$. The output of generator 10 may also be used in XOR 14 for operating on the incoming bit.

Figure 2:
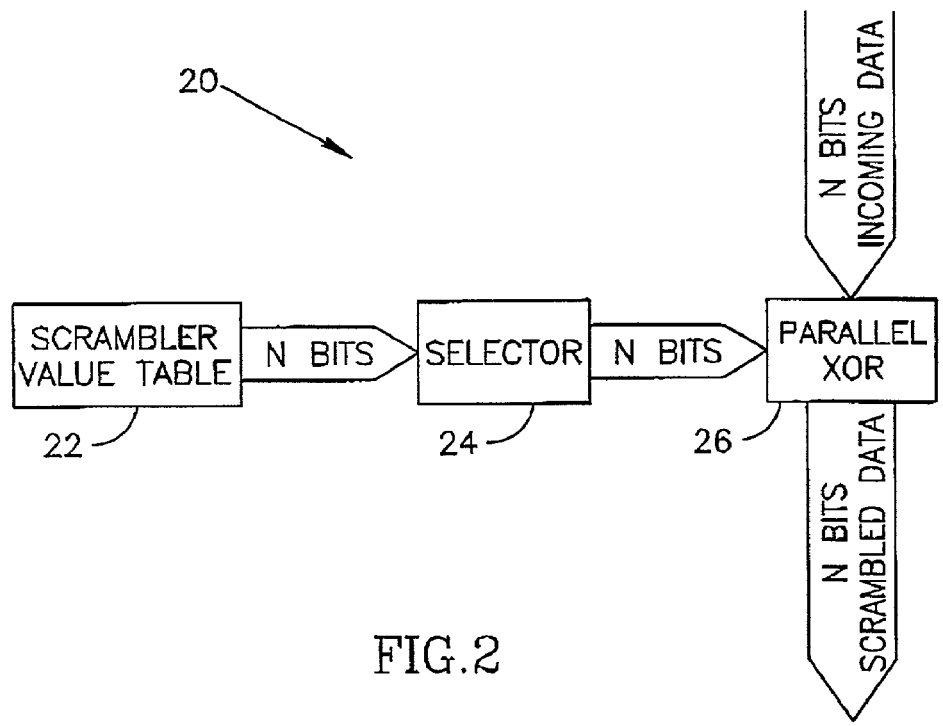
FIG. 2 is a block diagram illustration of a parallel scrambler, constructed and operative in accordance with a preferred embodiment of the present invention.

As mentioned hereinabove, the scrambler of FIG. 1 operates serially. Reference is now made to FIG. 2, which illustrates a scrambler 20 which operates in parallel and may produce generally the same scrambling operation as that of FIG. 1.

Scrambler 20 may comprise a scrambler value table 22, a selector 24 and a parallel XOR unit 26. Scrambler value table 22 may store the scrambler output values produced by generator 10 (i.e. the entire m-sequence) multiple times and selector 24 may select a set of N values which it provides to parallel XOR unit 26 for use in scrambling N bits of the incoming data.

Figure 3B:
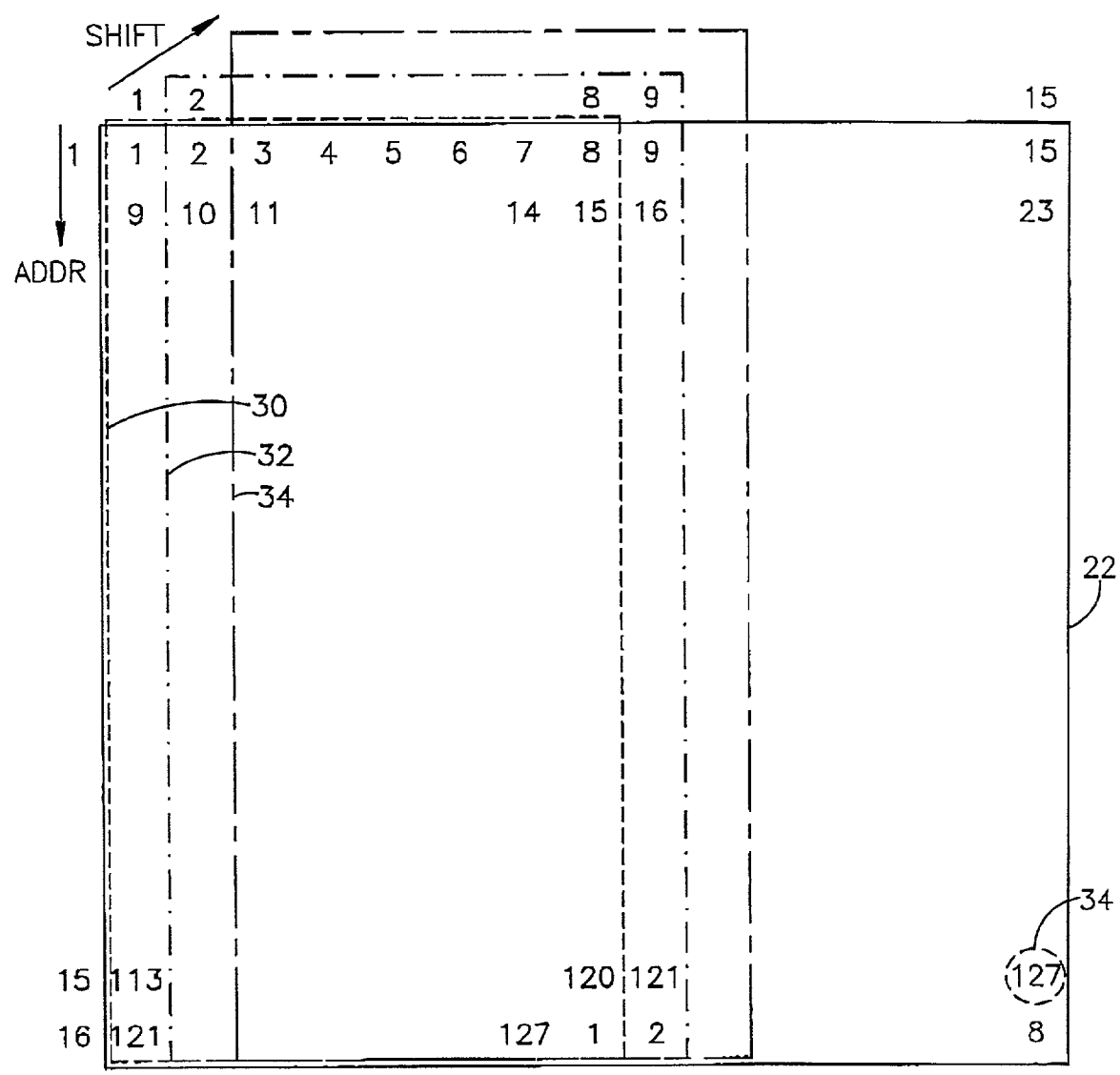
FIG. 3B is an illustration of the operation of reading the table of FIG. 3A.

Reference is now made to FIGS. 3A and 3B. FIG. 3A illustrates the architecture of an exemplary scrambler value table 22 for B=7, N=8 and FIG. 3B illustrates the operation of reading from it.

Table 22 may have at least 2N=16 rows and 2N-1=15 columns of storage elements that may store the 127 values which generator 10 produces. These are the values of the m-sequence. The scrambler values may be stored in order, where the first row of table 22 may store the first 2N-1 values (i.e. 1 to 15), the second row may store the N+1th to the 3N-1th values, etc. In other words, a row R may store the 2N-1 values from (R-1)N+1 to (R+1)N-1. Moreover, the fifteenth row stores the values 113 to 127 and the sixteenth row stores the values 121 to 127 in columns 1 through 7, and the values 1 through 8 in columns 8 through 15.

As shown in FIG. 3B, scrambler value table 22 may be divided into multiple swats which store the 127 bit m-sequence plus one extra bit. Swath 30 may be formed of the first 8 columns and may store the m-sequence beginning from the first value. The last bit of swath 30 (stored in the (16,8) storage element) may store the first value of the m-sequence. Swath 32 may be formed of columns 2–9 and may store the in-sequence beginning from the second value, The last bit of swath 32 (stored in the (16,9) storage element) may store the second value of the m-sequence.

The swaths may be read in order. The rows of swath 30 may be read first (using an address variable ADDR), producing the m-sequence in blocks of 8 bits. The last row of swath 30 may provide the last 7 bits of the m-sequence and the first bit of the next copy of the in-sequence. Swath 32 (columns 2–9) may be read next, beginning at the first row of table 22. Moving from swath 30 to swath 32 may be a shift of one column, indicated by a shift variable SHIFT.

The table may be read by swath by swath until the final swath is read. The final swath may be read until the end of the m-sequence, the $127^{th}$ bit, is achieved. This bit, labeled 34, may be stored in storage element (15,15).

Figure 4:
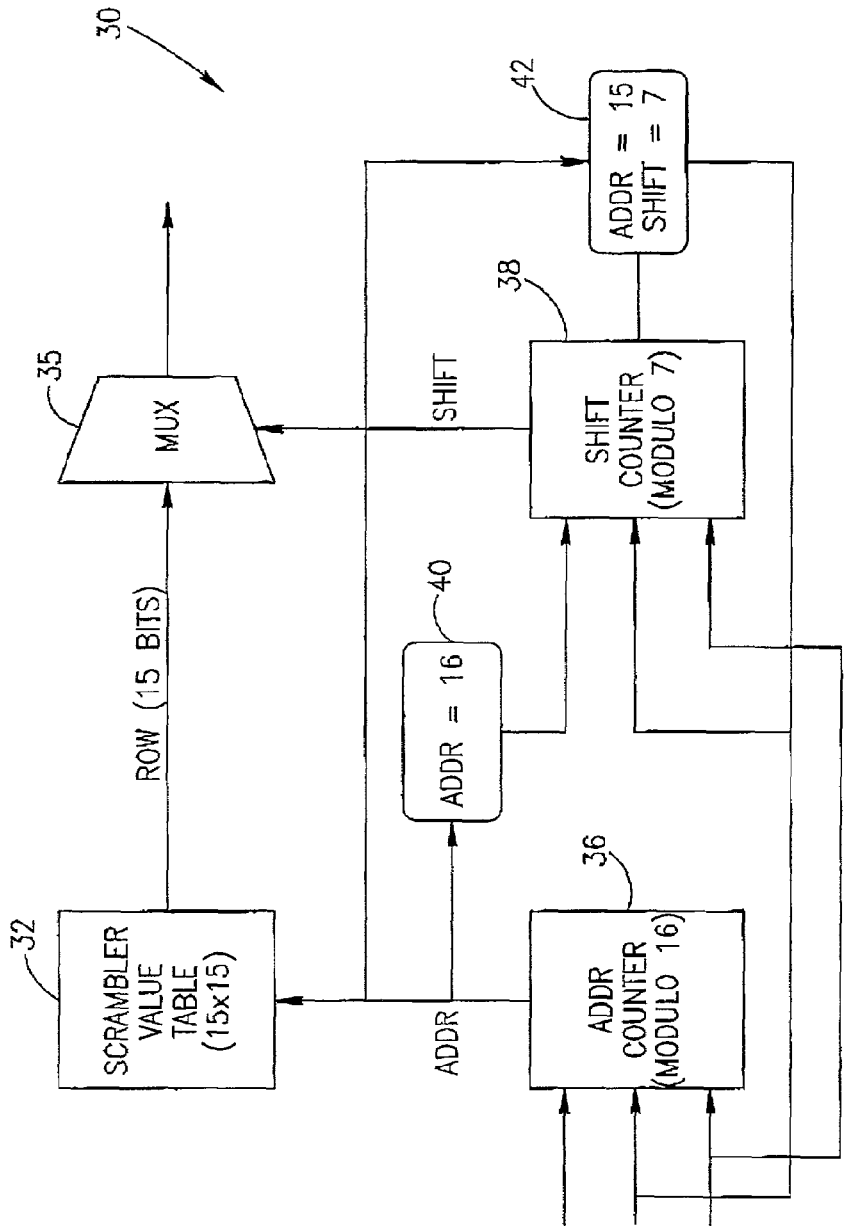
FIG. 4 is an illustration of an exemplary scrambler, constructed and operative in accordance with a preferred embodiment of the present invention.

Reference is now made to FIG. 4, which illustrates an exemplary scrambler 30 of the present invention using scrambler value table 22. Scrambler 30 may comprise scrambler value table 22, a multiplexer 35, an address counter 36, a shift counter 38 and two conditionals or comparators 40 and 42.

Scrambler value table 22 may be at least 15 bits wide and 16 rows long and may store multiple copies of the 127 bit m-sequence in the manner described above. Thus, the first row may store the first 15 bits of the m-sequence, the second row may store from bits 9 to 23, etc.

Address counter 36 may count the row number, from 1 to 16, and may output an address value to table 22 corresponding to the current row number. In response, table 22 may output the 15 bits of the selected row to multiplexer 35. Shift counter 38 may count a SHIFT variable, from 0 to 7, and may provide the current SHIFT value to multiplexer 35. Multiplexer 35 may select 8 bits of the 15 bit row produced by table 22 beginning at the SHIFT+1th bit of the row.

Address counter 36 also may output the address value to conditional 40 which may produce an enable signal to an enable input of shift counter 38 if the address value ADDR has reached 16. Shift counter 38 may increase the SHIFT variable upon receipt of the enable signal and may provide the current SHIFT value to multiplexer 35. The SHIFT variable is increased only once the address value ADDR has reached 16.

Conditional 42 may receive both the SHIFT variable and the address value ADDR may determine when the address value ADDR reaches 15 and the SHIFT variable reaches 7. This is the end of the operation. Upon achieving this condition, conditional 42 may output a signal to the reset inputs of address counter 36 and shift counter 38.

Figure 5:
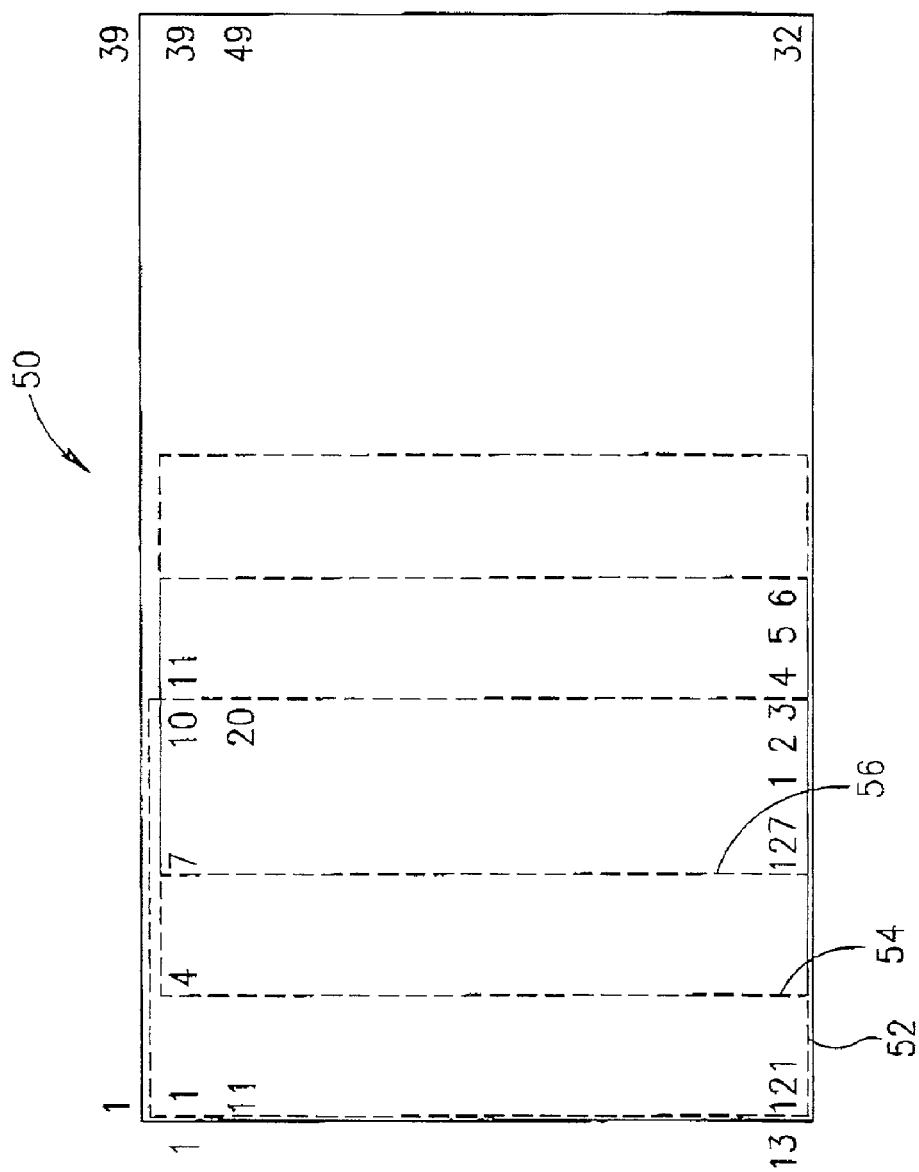
FIG. 5 is an illustration of a further table useful in the scrambler of FIG. 4.

Reference is now made to FIG. 5, which illustrates a second scrambler value table, labeled 50, for N=10. Table 50 has at least 13 rows and 39 columns. The rows may store 4N−1 values where a row R may store the 4N−1 values from (R−1)N+1 to (R+3)N−1. The final row may store the values 121 to 127 in columns 1 through 7, and the values 1 through 32 in columns 8 through 39, Scrambler value table 50 may be divided into multiple swaths, of which three, 52, 54 and 56, are marked, which store the 127 bit m-sequence. In this embodiment, the swaths store three extra bits.

Swath 52 may be formed of the first 10 columns and may store the m-sequence beginning from the first value. The last three bits of swath 52 may store the first three values of the m-sequence. Since reading the last row of swath 52 provides the first three values of the m-sequence, the next swath, swath 54, may store the m-sequence beginning from the fourth value (i.e. be formed of columns 4–13). The last three bits of swath 54 may store the fourth through sixth values of the m-sequence.

Table 50 may be read similarly to that of table 22 with the exception that the SHIFT variable is incremented by three, rather than by 1 for table 22. The final swath is read until the end of the m-sequence, the $127^{th}$ bit, is achieved.

In general, any Bth order serial feedback scrambler, having $2^B-1$ scrambler values, may be implemented as a N bit parallel feedback scrambler according to the present invention. The minimum table size may be determined as follows:

Length of m-sequence $S=2^B-1$

Number of rows $NR=\mathrm{round}(S/N)+1$

Number of extra bits $NE=N-(S-(NR-1)*N)$

Number of columns $NC=(NE+1)N-1$

The rows R begin with the values (R−1)N+1 and the size of the SHIFT variable is NE.

The methods and apparatus disclosed herein have been described without reference to specific hardware or software. Rather, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

It will be appreciated by persons skilled in the art that the present invention is not limited by what has been particularly shown and described herein above. Rather the scope of the invention is defined by the claims that follow:

The invention claimed is:

1. A data scrambler comprising:
    a table adapted to store scrambling values of an m-sequence, said table formed into at least two overlapping swaths of N columns, wherein each swath stores said m-sequence and said m-sequence of one swath is shifted from said m-sequence of a second swath; and
    a selector adapted to read a current swath N bits at a time for use in scrambling N bits of input data in parallel and to shift to the next swath.

2. A data scrambler according to claim 1 wherein a row R stores values of said m-sequence beginning with the (R−1) N+1th value of said m-sequence.

3. A data scrambler according to claim 2 wherein N is eight and said m-sequence is 127 bits long.

4. A data scrambler according to claim 3 wherein said table has at least 16 rows and at least 15 columns.

5. A data scrambler according to claim 4 wherein said selector comprises:
    a first counter adapted to count a first value modulo 16 and to generate an address from said value for said table;
    a second counter adapted to count second value modulo 7 whenever said first value reaches 16; and
    a multiplexer adapted to select eight bits of a row of said table indicated by said address starting at the column having said second value.

6. A data scrambler according to claim 1 wherein the length S of m-sequence is $2^B-1$, the number NR of rows of said table is round(S/N)+1, the number NE of extra bits is N−(S−(NR−1)*N)) and the number NC of columns of said table is (NE+1)N−1.

7. A data scrambler comprising:
    a table having rows and columns adapted to store scrambling values of an m-sequence, wherein a row R has more than N storage elements and stores values of said m-sequence beginning with the (R−1)N+1th value of said m-sequence; and
    a selector adapted to select N consecutive bits of said m-sequence at a time from said table for use in scrambling N bits of input data.

8. A data scrambler according to claim 7 wherein N is eight and said m-sequence is 127 bits long.

9. A data scrambler according to claim 8 wherein said table has at least 16 rows and at least 15 columns.

10. A data scrambler according to claim 9 wherein said selector comprises:
    a first counter adapted to count a first value modulo 16 and to generate an address from said first value for said table;
    a second counter adapted to count second value modulo 7 whenever said first value reaches 16; and
    a multiplexer adapted to select eight bits of a row of said table indicated by said address starting at the column having said second value.

11. A data scrambler according to claim 7 wherein the length S of m-sequence is $2^B-1$, the number NR of rows of said table is round(S/N)+1, the number NE of extra bits is N−(S−(NR−1)*N)) and the number NC of columns of said table is (NE+1)N−1.

12. A method comprising:
    storing scrambling values of an m-sequence in a table, said table formed into at least two overlapping swaths of N columns, wherein each swath stores said m-sequence and said m-sequence of one swath is shifted from said m-sequence of a second swath;

reading a current swath N bits at a time;

scrambling N bits of input data in parallel using said N bits of said current swath; and when said swath is finished, shifting to another swath NE bits from the current swath.

13. A method according to claim 12 wherein the length S of m-sequence is $2^B-1$, the number NR of rows of said table is round(S/N)+1, the number NE of extra bits is N—(S-(NR-1)*N)) and the number NC of columns of said table is (NE+1)N-1.

14. A method according to claim 13 and wherein said reading comprises:

counting a first value module NR;

generating an address from said first value for said table;

counting a second value modulo N-1 whenever said first value reaches NR; and selecting N bits of a row of said table indicated by said address starting at the column having said second value.

* * * * *